Nov. 4, 1969  J. M. STEINKE  3,475,977
ROTARY STEP MECHANISM
Filed Jan. 2, 1968  3 Sheets-Sheet 1

INVENTOR
JAMES M. STEINKE
BY
HIS ATTORNEYS

Nov. 4, 1969

J. M. STEINKE 3,475,977

ROTARY STEP MECHANISM

Filed Jan. 2, 1968

INVENTOR
JAMES M. STEINKE

BY
HIS ATTORNEYS

Nov. 4, 1969  J. M. STEINKE  3,475,977

ROTARY STEP MECHANISM

Filed Jan. 2, 1968  3 Sheets-Sheet 3

INVENTOR
JAMES M. STEINKE

HIS ATTORNEYS 3,475,977
ROTARY STEP MECHANISM
James M. Steinke, Fairport, N.Y., assignor to The National Cash Register Company, Dayton, Ohio, a corporation of Maryland
Filed Jan. 2, 1968, Ser. No. 695,064
Int. Cl. F16h 21/14, 21/48
U.S. Cl. 74—66                                  13 Claims

ABSTRACT OF THE DISCLOSURE

An intermittent rotary motion device which utilizes an input of constant velocity rotation. The device includes a canted-crank connecting member and a shaft member upstanding therefrom, and, when one end of the connecting member is rotated by a crank, a cone of revolution is developed by the connecting member, with said shaft member being located at the apex of the cone. As the connecting member is rotated, the shaft member oscillates in a plane which is perpendicular to the rotating axis of the output shaft included in the device. The connecting member is used to connect an input shaft of the device to the output shaft thereof to supply a first component of constant angular rotation thereto. When the shaft member is oscillated in said plane, a second component of motion is added to said output shaft to combine with the first componet of constant angular rotation to thereby produce a dwell in said output shaft.

Background of the invention

This invention relates to a motion-translating device which utilizes an input of constant velocity rotation to produce an output of intermittent rotary motion.

The prior-art intermittent rotary motion devices of which applicant has knowledge are generally expensive to produce and cumbersome to operate, and generally do not produce a range of operating speeds inherent in applicant's invention. All of applicant's embodiments of the invention disclosed herein utilize an input of constant velocity rotation and a canted crank member means. When oscillated, the crank member means produces an oscillatory component of motion which is "vectorially added" to said input to alternately produce "dwells" in the output shaft of the invention and velocities exceeding the rotational velocity of said input. Applicant's invention is useful in indexing devices which operate at moderate speeds and require a dwell in the output shafts thereof, and may be used in business equipment machines like printers, form feeders, tape advance transport mechanisms, and punched-card-feeding equipment, to name only a few of the possible useful applications thereof.

Summary of the invention

The intermittent rotary motion device of this invention includes an input means of constant velocity rotary motion which is mounted in a frame means and an output shaft which is also rotatably mounted in said frame means. First connecting means operatively connect said input means with said output shaft so as to supply a constant angular rotation thereto. The first connecting means includes a connecting member having a shaft member whose longitudinal axis is perpendicular to the longitudinal axis of said output shaft; means for supporting the connecting member for movement about a pivot point which lies between said input means and said output shaft; and crank means. The device also includes second connecting means which operatively connect the crank means with said input means to be rotated thereby. When rotated, the crank means are effective to oscillate said shaft member in a plane which is perpendicular to said axis of the output shaft, and the oscillating motion of the shaft member is effective to alter the motion imparted to said output shaft by said first connecting means so as to produce at least one dwell in the output shaft for a predetermined angular rotation of said input means. Three embodiments of the invention are disclosed herein, and all embodiments employ a connecting member which generates cones of revolution when rotated by said crank means.

Description of the preferred embodiments

All three embodiments of the invention utilize a first connecting means operatively connecting the input means with the output means thereof so as to supply a component of constant angular velocity thereto. The first connecting means includes a canted crank construction which is oscillated by a second ocnnecting means, and the canted crank construction, when oscillated, is effective to add a second component of motion to the output means. When the first and second components of motion are equal and opposite to each other, a "dwell" is produced at the output means. When the first and second components of motion are equal and applied in the same direction, the angular velocity of the output means reaches a velocity which is twice that of the input means. The change in direction of the second component of motion has harmonic motion characteristics which provide for smooth and gradual accelerations at the output means.

Figure 1:
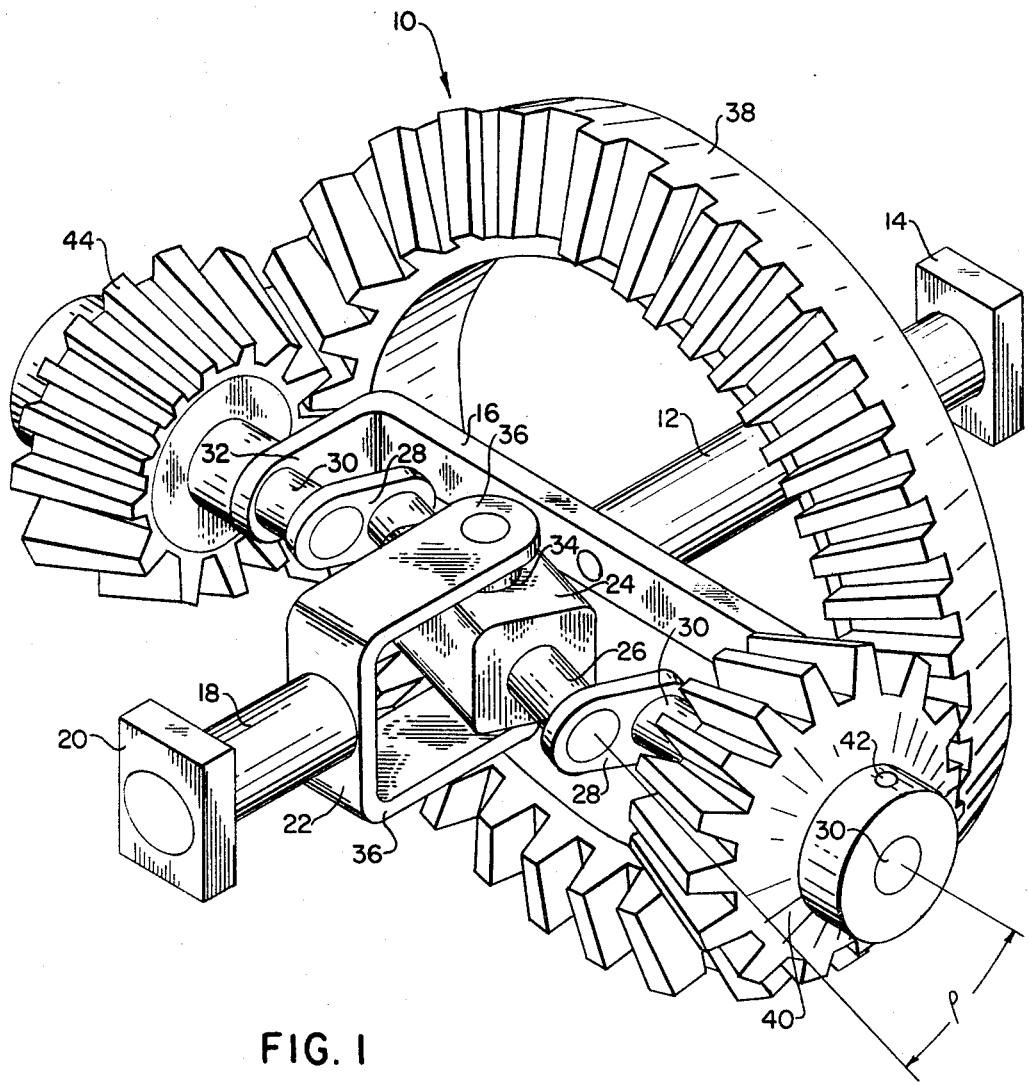
FIG. 1 is a general view, in perspective, of a first embodiment of this invention, showing the canted crank construction used and the means for oscillating it.

FIG. 1 shows a general view, in perspective, of a first embodiment of the intermittent rotary motion device 10 of this invention. The input means to the device 10 includes an input shaft 12, which is rotatably mounted in a frame means 14 (shown diagrammatically as a block), and a bifurcated or U-shaped input member 16, which is fixed to the shaft 12 to rotate therewith. The output means of the device 10 includes an output shaft 18, which is rotatably mounted in a frame means 20 (also shown diagrammatically as a block), and a bifurcated member 22, which is fixed to the shaft 18 to rotate therewith.

The first connecting means operatively connecting the input means with the output means so as to supply a component of constant angular velocity motion thereto includes the following. FIG. 1 shows a connecting member 24 having a shaft 26 rotatably mounted therein and extending from opposite ends thereof. The shaft 26 is axially restrained in the connecting member 24 by conventional C washers (not shown). Each end of the shaft 26 is fixed to one end of a separate crank 28, the other end of the crank being fixed to a shaft 30. The shafts 30 are axially aligned with each other, and their longitudinal axes and the longitudinal axis of the shaft 26 all lie in the same plane. Each shaft 30 is rotatably supported in an arm 32 of the bifurcated member 16, and the arms 32 are spaced apart to receive the connecting member 24, the shaft 26, and the cranks 28 therebetween as shown. The connecting member 24 also has shaft members 34 secured thereto and extending from opposed faces thereof, with the longitudinal axes of said shaft members being aligned and perpendicular to the longitudinal axis of the shaft 26. The free ends of the shaft members 34 are pivotally joined to the arms 36 of the output bifurcated member 22. The axes of the shaft members 34, the shaft 26, and the shafts 30 intersect at a common intersection point which lies on an imaginary line joining the rotating axes of the shafts 12 and 18, which are axially aligned. The shaft 26 is perpendicular to the cranks 28, and its longitudinal axis is offset from the longitudinal axes of the shafts 30 by a small acute angle $p$ (FIG. 1). Using only the structure described in detail so far, it is apparent that, when the shaft 12 is rotated at a constant velocity, the output shaft 18 will also be rotated at the same angular velocity to provide the first component of motion thereto.

To provide the second component of motion, which is to be combined with the first component by the device 10 (FIG. 1) to produce a dwell, a second connecting means is used. The second connecting means includes a stationary ring gear 38, which is fixed to the frame means, and a driving bevel gear 40 in mesh with the gear 38. The gear 40 is fixed to rotate with the shaft 30 by a pin 42, and, to improve the dynamic balance of the device 10, a second bevel gear 44 is rotatably mounted on its associated shaft 30. The gear 44 also is in mesh with the ring gear 38. When the input shaft 12 is rotated, the bifurcated member 16 and the elements carried thereby, including the connecting member 24, are rotated about the axis of the input shaft 12, and, in addition, the shaft 30 is rotated about its own axis due to the coaction between the bevel gear 40 and the ring gear 38 as the gear 40 travels around the ring gear 38. As the shaft 30 is rotated, it rotates the ends of the shaft 26 (via the cranks 28) and the connecting member 24 to thereby generate cones of revolution having an axis of gyration (or imaginary axis) which is coincident with an extension of the axis of rotation of the shafts 30, and the apexes of the generated cones will be coincident with the common intersection point previously mentioned. As the connecting member 24 is rotated, the shaft members 34 will be forced to oscillate (about said common intersection point) in a plane which is perpendicular to the rotating axis of the output shaft 18. Whenever the oscillatory motion (the second component of motion) of the shaft members 34 is equal and opposite to the first component of motion due to the connecting member 24 rotated about the axis of the input shaft 12, a dwell will be produced in the output shaft 18 while the input shaft 12 is rotated at a constant angular velocity. Whenever the oscillatory motion of the shaft members 34 is equal to and applied in the same direction as the first component of motion, the output shaft 18 will rotate at twice the angular velocity of the input shaft 12. The transition points in the velocity of the output shaft 18 between a dwell and its maximum velocity are gradual and have harmonic motion characteristics due to the construction of the device 10.

Some additional construction details of the embodiment shown in FIG. 1 are as follows. The number of attainable dwells in the output shaft 18 is related directly to the ratio of the number of teeth in the ring gear 38 to the number of teeth in the driving gear 40. The choice of this ratio will dictate the particular value for the acute angle $p$ which is formed by the intersection of the longitudinal axes of the shaft 26 and the shafts 30. When the longitudinal axes of the shafts 30, the shaft 26, and the output shaft 18 lie in the same plane, the bifurcated output member 22 will be positioned at ninety degrees relative to the bifurcated input member 16, as shown. As soon as the connecting member 24 begins to be rotated by the cranks 28, an oscillatory component of motion (the second component) will be substracted from or added to the rotation of the first component of motion to produce the alternate dwells and increased velocities in the output shaft 18, previously mentioned. Because the oscillatory motion of the shaft members 34 is harmonic (due to the generation of the cones previously mentioned), the usable dwell at the output shaft 18 may be considered to be effective for approximately thirty degress of rotation of the input shaft 12 even though, technically, the exact dwell is instantaneous.

Figure 2:
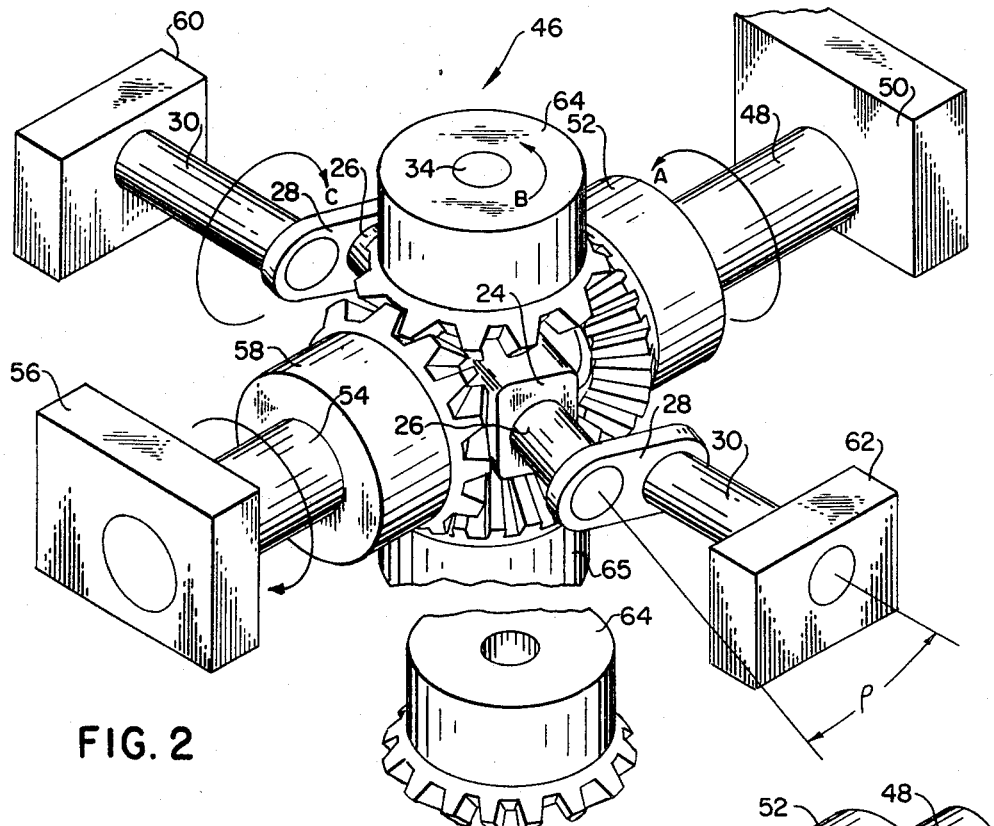
FIG. 2 is a general view, in perspective, of a second embodiment of the invention, using two input shafts, and showing the canted crank construction being oscillated by one of said input shafts.
Figure 3:
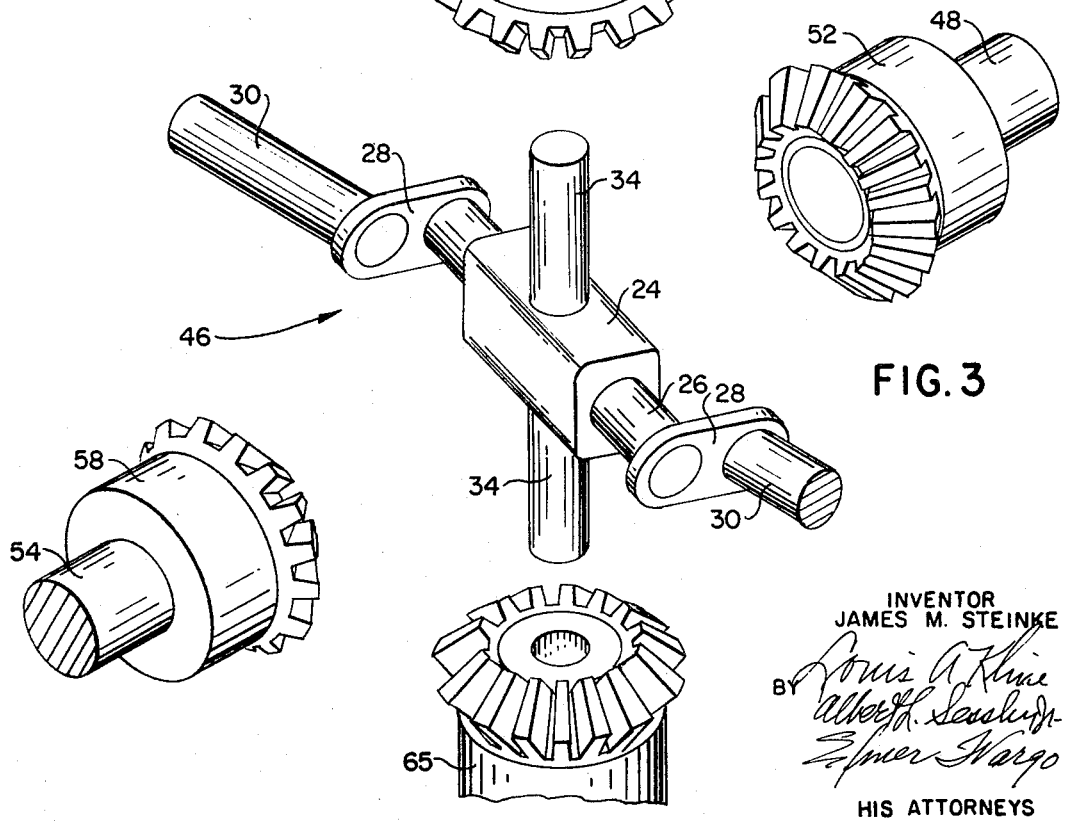
FIG. 3 is a general exploded view, in perspective, of the embodiment shown in FIG. 2, showing more details of the canted crank construction.

FIGS. 2 and 3 show a second embodiment of the device, designated generally as 46, which operates upon the same general principles as the device 10 shown in FIG. 1. The input means to the device 46 includes an input shaft 48, which is rotatably mounted in a frame means depicted as a block 50. One end of the shaft 48 has a driving bevel gear 52 fixed thereto to rotate therewith, and the other end may have a drive pulley (not shown) attached thereto to supply constant velocity rotation to the shaft. The output means of the device 46 includes an output shaft 54, which is rotatably mounted in the frame means, shown as a block 56, and the shaft has a bevel gear 58 fixed thereto to rotate therewith.

The first connecting means operatively connecting the input means with the output means of the device 46 to supply a component of constant angular velocity motion thereto is shown in FIGS. 2 and 3. The connection means includes the connecting member 24, the shaft 26, the cranks 28, and the shafts 30, which are identical to their counterparts shown in FIG. 1, already described; however, the shafts 30 are supported by and rotatably mounted in the frame means (shown as blocks 60 and 62). The shaft members 34 are positioned perpendicular to the shaft 26 and have bevel gears 64 and 65 rotatably mounted thereon, and both of these gears are in mesh with the gear 52, secured to the input shaft 48, and the gear 58, secured to the output shaft 54. With the shafts 30 held stationary, it is apparent that the connecting member 24 also will be stationary, and the constant angular velocity motion imparted to the input shaft 48 will be transferred to the output shaft 54 via the bevel gears 52, 64, 65, and 58.

To provide the second component of motion which is to be combined with the first component by the device 46 (shown in FIGS. 2 and 3) to produce a dwell, a second connecting means is used. In the device 46, the second connecting means includes a means for rotating one of the shafts 30, which means may be a separate drive pulley (not shown). When, for example, the shaft 30 (shown in the left in FIG. 2) is rotated by said drive pulley, the ends of the connecting member 24 will be rotated about the longitudinal axis of the shafts 30 to generate two cones of revolution with the apexes thereof being coincident with the common intersection point previously mentioned. The longitudinal axes of the input shaft 48, the output shaft 54, the shaft 26, and shaft members 34, and the shafts 30 all intersect at this common intersection point. As the cones of revolution are developed, the shaft members 34 will oscillate in a plane which is perpendicular to the output shaft 54, and the shaft members 34 will be constrained to movement in this plane due to the gears 58 and 52 being constrained against axial movement away from each other. When the input shaft 48 rotates in the direction A (counterclockwise as viewed in FIG. 2), the gear 52 will also rotate the gear 64 counter-clockwise about its own shaft member 34, as indicated by the arrow B. If the shaft 30 is now rotated clockwise, as indicated by the arrow C, the shaft member 34 associated with the gear 64 will pivot about the common intersection point and move towards the block 60, producing the second component of motion, with the resulting effect of slowing down the rotation of the output shaft 54 until a dwell is reached. When the shaft member 34 associated with the gear 64 moves away from the block 60, the second component of motion adds to the first component, as in the device of FIG. 1, until a maximum velocity is reached, and then the slowing-down process is again repeated to produce another dwell. The number of dwells obtainable may vary from just a few to several hundred per revolution of the output shaft 54, and is predicted by the ratio of the angular velocity of the shaft 30 to the angular velocity of the shaft 48, and the acute angle $\rho$ (FIG. 2), which includes the axis of the shaft 26, the common intersection point, and the axis of the shaft 30. To provide a dwell, this acute angle is so selected that the displacement of the shaft member 34 (in a plane perpendicular to the output shaft 54) has a maximum velocity component which is equal and opposite to the velocity component of the output shaft 54 if the shaft member 34 were not oscillated (that is, if the shaft 30 were not rotated). The oscillatory motion of the shaft members 34 (in a plane perpendicular to the output shaft 54) is harmonic due to the generation of the cones of revolution previously mentioned, and, as a result, the changes in acceleration in the device 46 are gradual, as in the device of FIG. 1.

Figure 4:
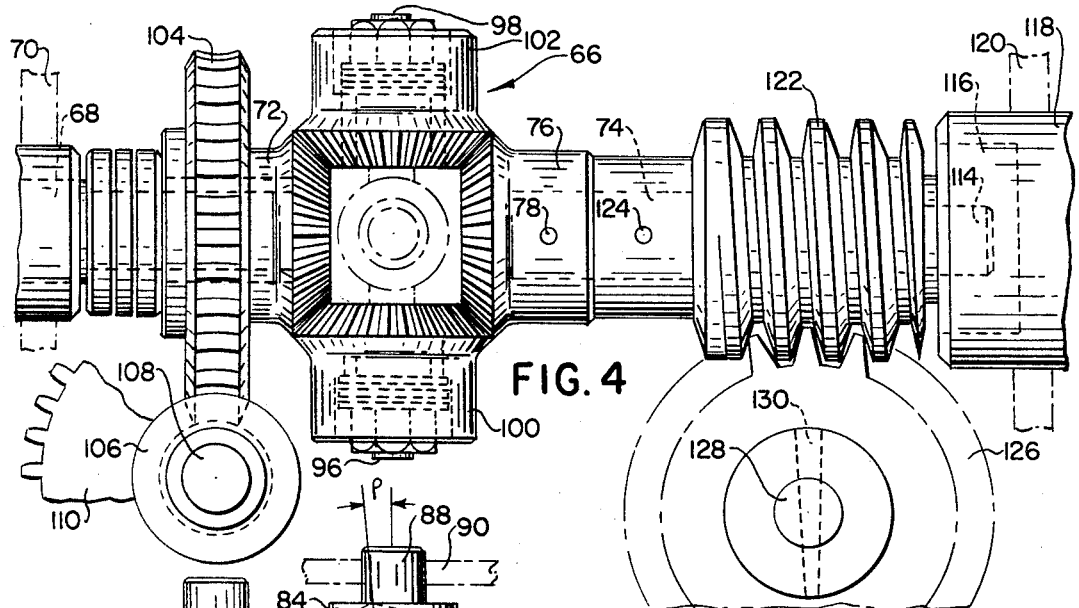
FIG. 4 is a side view, in elevation, of a third embodiment of the invention (similar to that shown in FIG. 2), showing both input shafts being interconnected by a gear means.
Figure 5:
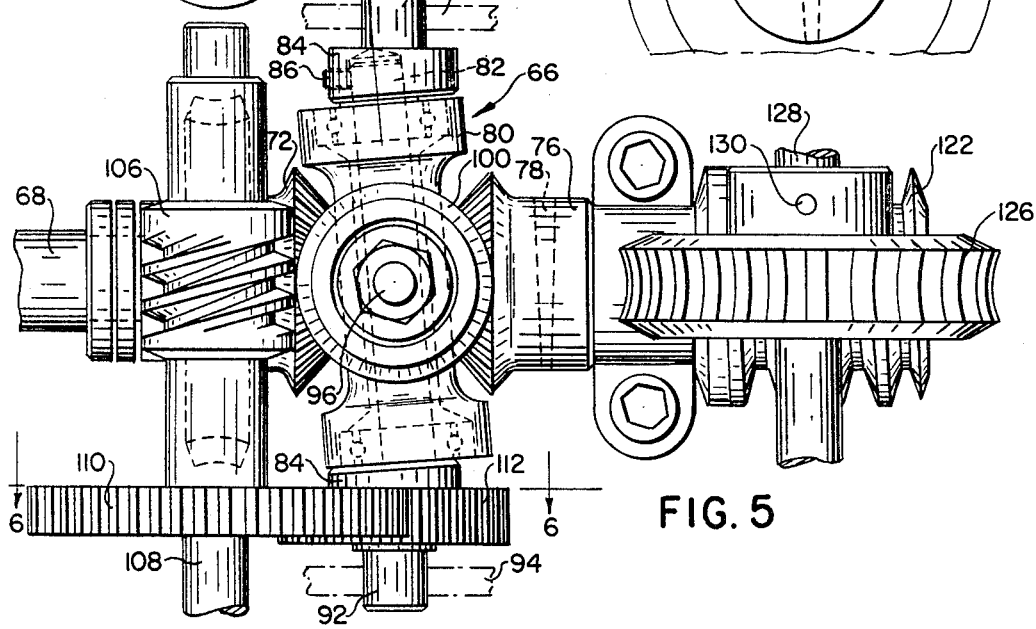
FIG. 5 is a bottom plan view of the embodiment shown in FIG. 4, showing more details of the canted crank construction.
Figure 6:
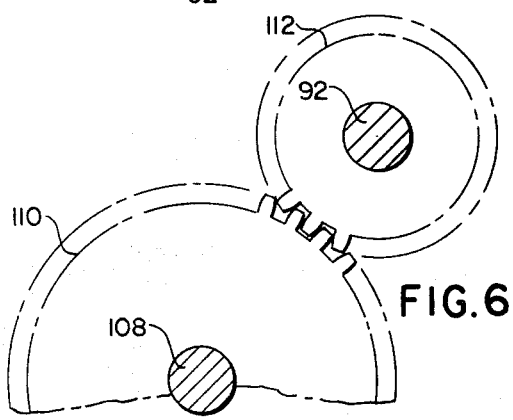
FIG. 6 is a side view, in elevation, taken along the line 6—6 of FIG. 5, showing the means for interconnecting both input shafts.

FIGS. 4, 5, and 6 show a third embodiment of the intermittent rotary device (designated 66) of this invention. The device 66 operates substantially the same as does the device 46, shown in FIGS. 2 and 3. The device 66 includes an input shaft 68, which is rotatably mounted in a frame means 70 (shown in dashed outline in FIG. 4). The input shaft 68 has an input bevel gear 72 fixed to rotate therewith, and its axis of rotation is axially aligned with the rotating axis of an output shaft 74, which has an output bevel gear 76 fixed to rotate therewith by a pin 78. The connecting member 80 (best shown in FIG. 5) has a shaft 82 rotatably mounted therein, and each end of the shaft 82 is fixed in coupling members 84 by a set screw 86. The topmost coupling member 84 (shown in FIG. 5) is fixed to rotate with a shaft 88, which is rotatably mounted in the frame means 90 (shown in dashed outline), and, similarly, the lowermost coupling member 84 is fixed to rotate with a shaft 92, which is rotatably mounted in a frame means 94 (shown in dashed outline). The rotating axes of the shafts 88 and 92 are axially aligned with each other, and the longitudinal axis of the shaft 82 is offset from the axes of the shafts 88 and 92 by an angle $\rho$ (FIG. 5), so as to provide a cranking motion to generate cones of revolutions when the ends of the connecting member 80 are rotated, as previously explained. The coupling members 84 perform the same function as the cranks 28 in FIG. 2. The shaft members 96 adn 98 are positioned perpendicular to the connecting member 80 and extend from opposite sides thereof, as best shown in FIG. 4. A bevel gear 100 is rotatably mounted and retained on the shaft member 96, and, similarly, a bevel gear 102 is rotatably mounted and retained on the shaft member 98. Both bevel gears 100 and 102 are in mesh with the input gear 72 and the output gear 76. The axes of the shafts 88 and 92, of the shaft members 96 and 98, and of the shaft 82 all intersect at a common intersection point which lies on the common rotating axis of the input gear 72 and the output gear 76.

The device 66 shown in FIGS. 4, 5, and 6 operates in the same manner as does the device 46 shown in FIGS. 2 and 3, with the following exception. Instead of having power supplied to two separate input shafts, as in the device 46, the device 66 has power supplied to only one input shaft, but has gear means interconnecting the two input shafts; that is, the shaft 68 and the shaft 92. The gear means includes a gear 104, which is fixed to the input gear 72 to rotate therewith, and the gear 104 drives a worm gear 106, which is fixed to rotate with the shaft 108. A spur gear 110, which also is fixed to the shaft 108, is in mesh with a second spur gear 112 (FIGS. 5 and 6), which is fixed to rotate with the shaft 92 which is the second input shaft to the device 66. From this construction, it is apparent that, when the input shaft 68 is rotated, the shaft 92 also will be rotated in timed relationship therewith to effect the dwells, as previously explained.

The device 66 may also have additional gear means operatively connected to the output shaft 74 thereof to alter the output thereof, as shown in FIGS. 4 and 5. The output shaft 74 has a reduced-diameter end portion 114, which is rotatably mounted in an end thrust bearing 116, which is fixed in a support member 118, which in turn is secured to a frame means 120 (shown in dashed outline in FIG. 4). A worm gear 122 is fixed to rotate with the output shaft 74 by a pin 124 (FIG. 4), and the gear 122 drives a gear 126, in mesh therewith. The gear 126 is fixed to rotate with a shaft 128 by a pin 130, and the shaft 128 is perpendicular to the output shaft 74.

What is claimed is:

1. An intermittent rotary motion device comprising:

frame means;

input means of constant angular velocity mounted on said frame means and including an input shaft and an input member fixed thereto to rotate therewith;

an output shaft rotatably mounted in said frame means and having an output member fixed thereto for rotation therewith;

first connecting means operatively connecting said input means with said output member so as to supply a constant angular rotation thereto;

said first connecting means including a connecting member having a shaft member extending therefrom, said shaft member having a longitudinal axis which is perpendicular to the longitudinal axis of said output shaft; support means for supporting said connecting member for movement about a pivot point which lies on an imaginary line between said input and output shafts; and crank means; and second connecting means operatively connecting said crank means with said input means, said crank means, when rotated, being effective to oscillate said shaft member in a plane which is perpendicular to said axis of said output shaft, the oscillating motion of said shaft member being effective to alter the motion imparted to said output shaft by said first connecting means so as to produce at least one dwell in said output shaft for a predetermined angular rotation of said input means.

2. The device as claimed in claim 1 in which said crank means is effective to rotate one end of said connecting member about an imaginary axis which is perpendicular to an extension of said axis of said output shaft so as to generate a cone of revolution having the apex thereof coincident which said pivot point.

3. The device as claimed in claim 2 in which said input and output members are bifurcated.

4. The device as claimed in claim 3 in which said connecting member, said crank means, and said support means are rotated about the axis of said input shaft by said bifurcated input member.

5. The device as claimed in claim 4 in which said second connecting means includes a stationary ring gear having a longitudinal axis coincident with the axis of said input shaft and a gear member rotatably mounted on one arm of said bifurcated input member and in mesh with said ring rear, said gear member being connected to said crank means to rotate it as said bifurcated input member is rotated about the axis of said input shaft.

6. An intermittent rotary motion device comprising:

frame means;

input means of constant angular velocity mounted on said frame means and including an input shaft and a bifurcated input member fixed thereto to rotate therewith;

an output shaft rotatably mounted in said frame means and having a bifurcated output member fixed thereto for rotation therewith;

first connecting means operatively connecting said input means with said output member so as to supply a constant angular rotation thereto;

said first connecting means including a connecting member having a shaft member extending therefrom, said shaft member having a longitudinal axis which is perpendicular to the longitudinal axis of said output shaft; support means for supporting said connecting member for movement about a pivot point which lies between said input and output shafts; and crank means which is effective to rotate one end of said connecting member about an imaginary axis which is perpendicular to an extension of said axis of said output shaft so as to generate a cone of revolution having the apex thereof coincident with said pivot point;

said connecting member, said crank means, and said support means being rotated about the axis of said input shaft by said bifurcated input member; and second connecting means operatively connecting said crank means with said input means and including a stationary ring gear having a longitudinal axis coincident with the axis of said input shaft, and a gear member rotatably mounted on one arm of said bifurcated input member and in mesh with said ring gear, said gear member being connected to said crank means to rotate it as said bifurcated input member is rotated about the axis of said input shaft; said crank means, when rotated, being effective to oscillate said shaft member in a plane which is perpendicular to said axis of said output shaft, the oscillating motion of said shaft member being effective to alter the motion imparted to said output shaft by said first connecting means so as to produce at least one dwell in said output shaft for a predetermined angular rotation of said input means;

said shaft member having a free end rotatably mounted in said bifurcated output member, and said connecting member having a first shaft rotatably mounted therein and extending from opposite sides thereof in a direction which is perpendicular to the axis of said shaft member, said first shaft having a longitudinal axis which is positioned at an acute angle to said imaginary axis, and said crank means being connected to one end of said first shaft.

7. The device as claimed in claim 6 in which said input and output shafts are in spaced axial alignment with each other and have axes of rotation which intersect said pivot point; the axes of said first shaft, said shaft member, and said imaginary axis all passing through said pivot point.

8. An intermittent rotary motion device comprising: frame means;

input means of constant angular velocity mounted on said frame means and including an input shaft and an input member fixed thereto to rotate therewith;

an output shaft rotatably mounted in said frame means and having an output member fixed thereto for rotation therewith;

first connecting means operatively connecting said input means with said output member so as to supply a constant angular rotation thereto;

said first connecting means including a connecting member having a shaft member extending therefrom, said shaft member having a longitudinal axis which is perpendicular to the longitudinal axis of said output shaft; support means for supporting said connecting member for movement about a pivot point which lies between said input and output shafts; and crank means; and second connecting means operatively connecting said crank means with said input means, said crank means, when rotated, being effective to oscillate said shaft member in a plane which is perpendicular to said axis of said output shaft, the oscillating motion of said shaft member being effective to alter the motion imparted to said output shaft by said first connecting means so as to produce at least one dwell in said output shaft for a predetermined angular rotation of said input means;

said input and output members being first and second bevel gears respectively, and said first connecting means also including a third bevel gear which is rotatably mounted on said shaft member and is in mesh with said first and second bevel gears.

9. The device as claimed in claim 8 in which said connecting member, said crank means, and said support means are rotated about an axis which is perpendicular to the longitudinal axis of said output shaft.

10. The device as claimed in claim 8 in which said second connecting means includes a second input shaft which is rotatably mounted in said frame means, and which second input shaft is connected to said crank means to rotate it in timed relationship with said input shaft.

11. The device as claimed in claim 10 in which said connecting member has a first shaft rotatably mounted therein and extending from opposed sides thereof in a direction which is perpendicular to the axis of said shaft member, said first shaft having a longitudinal axis which is positioned at an acute angle to said imaginary axis, said crank means being connected to the ends of said first shaft.

12. The device as claimed in claim 10 in which the axes of said first-named input shaft, said second input shaft, and said output shaft intersect one another at said pivot point; and the axis of said first shaft and said shaft member also pass through said pivot point.

13. The device as claimed in claim 12 further including gear connecting means operably connecting both said input shafts together for timed rotation.

References Cited

UNITED STATES PATENTS 1,716,971  6/1929  Miller _____ 74—66

OTHER REFERENCES

Mathurin et al., Epicyclic Incremental Motion Mechanism, July 1964, vol. 4, No. 2, p. 4, IBM Technical Bulletin.

FRED C. MATTERN, Jr., Primary Examiner

W. S. RATCLIFF, Jr., Assistant Examiner